US008818073B2

(12) United States Patent
Lee et al.

(10) Patent No.: US 8,818,073 B2

(45) Date of Patent: Aug. 26, 2014

(54) DISPLAY PANEL TEST APPARATUS AND METHOD OF TESTING A DISPLAY PANEL USING THE SAME

(75) Inventors: Bum-Suk Lee, Cheonan-si (KR); Eung-Sang Lee, Asan-si (KR); Gi-Chang Park, Yongin-si (KR); Jong-Jin Kim, Seoul (KR); Chan-Youn Park, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 586 days.

(21) Appl. No.: 12/976,476

(22) Filed: Dec. 22, 2010

(65) Prior Publication Data

US 2012/0026315 A1 Feb. 2, 2012

(30) Foreign Application Priority Data

Jul. 29, 2010 (KR) ........................ 10-2010-0073420

(51) Int. Cl.

*G06K 9/00* (2006.01)
*G09G 3/00* (2006.01)
*G09G 3/36* (2006.01)

(52) U.S. Cl.

CPC .......... *G09G 3/006* (2013.01); *G09G 2360/145* (2013.01); *G09G 2320/0257* (2013.01); *G06K 9/00* (2013.01); *G09G 3/36* (2013.01); *G09G 2360/16* (2013.01)

USPC ............ 382/145; 382/141; 382/202; 382/224

(58) Field of Classification Search

CPC ............ G01N 21/9501; G01N 21/956; G01N 21/6489; G01N 2021/8861; G01N 21/896; G06T 7/0004; G06T 7/0002; G01V 5/00; G09G 2320/0257; G09G 2360/145; G09G 2360/16; G09G 3/006; G09G 3/36

USPC .................................. 382/141, 145, 202, 224

See application file for complete search history.

(56) References Cited

U.S. PATENT DOCUMENTS

| | | | | | |
|---|---|---|---|---|---|
| 4,349,880 | A | * | 9/1982 | Southgate et al. | 702/40 |
| 5,754,153 | A | * | 5/1998 | Mizutome et al. | 345/97 |
| 5,797,011 | A | * | 8/1998 | Kroll et al. | 717/137 |
| 6,621,571 | B1 | * | 9/2003 | Shishido et al. | 356/237.5 |
| 6,632,113 | B1 | * | 10/2003 | Noma et al. | 445/2 |
| 6,661,425 | B1 | * | 12/2003 | Hiroaki | 345/629 |

(Continued)

FOREIGN PATENT DOCUMENTS

| | | |
|---|---|---|
| JP | 2005-037281 | 2/2005 |
| JP | 2005-043341 | 2/2005 |
| KR | 1020060108187 | 10/2006 |

*Primary Examiner* — Vu Le
*Assistant Examiner* — Aklilu Woldemariam
(74) *Attorney, Agent, or Firm* — Cantor Colburn LLP

(57) ABSTRACT

A display panel test apparatus includes: an image pickup part which picks up an image from a target display panel; a jig including a receiving part which receives the target display panel, a fixing part which fixes the image pickup part, and an adjusting part which adjusts an image pickup angle of the image pickup part; a pattern generating part which provides the target display panel with a test pattern; a defect extracting part which analyzes test image data provided from the image pickup part using a defect extracting algorithm and extracts display defect information, where the defect extracting algorithm includes different settings corresponding to different types of display defects; and a control part which generates evaluated data corresponding to a viewing angle of the target display panel using the image pickup angle of the image pickup part and the display defect information.

8 Claims, 9 Drawing Sheets

(56) References Cited

U.S. PATENT DOCUMENTS

| | | | | |
|---|---|---|---|---|
| 6,987,497 | B2 * | 1/2006 | Koyama | 345/87 |
| 7,411,410 | B2 * | 8/2008 | Kang et al. | 324/760.01 |
| 7,435,956 | B2 * | 10/2008 | Parker | 250/310 |
| 2003/0174214 | A1 * | 9/2003 | Shin et al. | 348/207.99 |
| 2003/0206231 | A1 * | 11/2003 | Chen et al. | 348/207.99 |
| 2004/0086168 | A1 * | 5/2004 | Kuwabara | 382/145 |
| 2006/0038581 | A1 * | 2/2006 | Kanai | 324/770 |
| 2006/0098189 | A1 * | 5/2006 | Oomori et al. | 356/237.5 |
| 2007/0025611 | A1 * | 2/2007 | Kanda et al. | 382/149 |
| 2007/0046321 | A1 * | 3/2007 | Kang et al. | 324/770 |
| 2007/0154081 | A1 * | 7/2007 | Levi et al. | 382/145 |
| 2007/0273626 | A1 * | 11/2007 | Kerofsky et al. | 345/87 |
| 2008/0018887 | A1 * | 1/2008 | Chen et al. | 356/237.2 |
| 2008/0063254 | A1 * | 3/2008 | Tanizaki et al. | 382/141 |
| 2008/0075352 | A1 * | 3/2008 | Shibuya et al. | 382/141 |
| 2008/0136847 | A1 * | 6/2008 | Yajima et al. | 345/690 |
| 2008/0297783 | A1 * | 12/2008 | Urano et al. | 356/237.5 |
| 2009/0281754 | A1 * | 11/2009 | Takatori | 702/82 |

* cited by examiner

DISPLAY PANEL TEST APPARATUS AND METHOD OF TESTING A DISPLAY PANEL USING THE SAME

This application claims priority to Korean Patent Application No. 2010-73420, filed on Jul. 29, 2010, and all the benefits accruing therefrom under 35 U.S.C. §119, the contents of which in its entirety is herein incorporated by reference.

BACKGROUND OF THE INVENTION

1. Field of the Invention

Exemplary embodiments of the present invention relate to a display panel test apparatus and a method of testing a display panel using the display panel test apparatus. More particularly, exemplary embodiments of the present invention relate to a display panel test apparatus that automatically tests a display panel and a method of testing the display panel using the display panel test apparatus.

2. Description of the Related Art

Generally, a liquid crystal display ("LCD") apparatus has a slim thickness, light weight and low power consumption, and thus the LCD apparatus is typically used for a monitor, a laptop computer, a cellular phone or a large-sized LCD television, for example.

Generally, the LCD apparatus includes an LCD panel that displays an image using a light transmittance of a liquid crystal, and a backlight assembly disposed under the LCD panel and which provides light to the LCD panel.

In a process of manufacturing a display apparatus including the LCD, various inspection processes are performed to detect a malfunction of a display panel. Generally, an eye inspection, in which an inspector directly detects defects of the display panel with his eyes, is used to detect the malfunction. For example, a test pattern is displayed on the display panel, and then the malfunction is visually checked by the inspector's eyes.

However, in the eye inspection, visibility may vary depending on inspection environment, so an error may occur in detecting the malfunction of the display panel. In addition, detection abilities of inspectors may vary according to maturities of inspecting skill, subjective judgment or emotional states of inspectors, and the reliability of the eye inspection is thereby substantially low.

BRIEF SUMMARY OF THE INVENTION

Exemplary embodiments of the present invention provide a display panel test apparatus which automatically and substantially accurately tests a display panel.

Exemplary embodiments of the present invention provide a method of testing a display panel using the display panel test apparatus.

According to an exemplary embodiment of the present invention, a display panel test apparatus includes an image pickup part, a jig, a pattern generating part, a defect extracting part and a control part. The image pickup part picks up an image from a target display panel. The jig includes a receiving part which receives a target display panel, a fixing part which fixes the image pickup part, and an adjusting part which adjusts an image pickup angle of the image pickup part. The pattern generating part provides the target display panel with a test pattern. The defect extracting part analyzes test image data provided from the image pickup part using a defect extracting algorithm, which includes different settings corresponding to different types of display defects, and extracts display defect information. The control part generates evaluated data corresponding to a viewing angle of the target display panel using an image pickup angle of the image pickup part and the display defect information.

According to another exemplary embodiment of the present invention, a method of testing the display panel using the display panel test apparatus includes fixing a target display panel to a receiving part of a jig; adjusting an image pickup angle of an image pickup part using an adjusting part fixed to the jig; providing the target display panel with a test pattern, obtaining test image data by picking up the test pattern using the image pickup part, extracting image defect information by analyzing the test image data using a defect extracting algorithm, where the defect extracting algorithm includes different settings corresponding to different types of display defects, and generating an evaluated data corresponding to a viewing angle of the target display panel based on the image pickup angle of the image pickup part and the display defect information.

According to exemplary embodiments, the display panel test apparatus automatically tests the display panel, so that the difference between various detection abilities according to different individual inspectors is substantially decreased, and the reliability of the inspection is thereby substantially increased.

BRIEF DESCRIPTION OF THE DRAWINGS

The above and other features and aspects of the present invention will become more apparent by describing in detail exemplary embodiments thereof with reference to the accompanying drawings, in which.

DETAILED DESCRIPTION OF THE INVENTION

Figure 1:
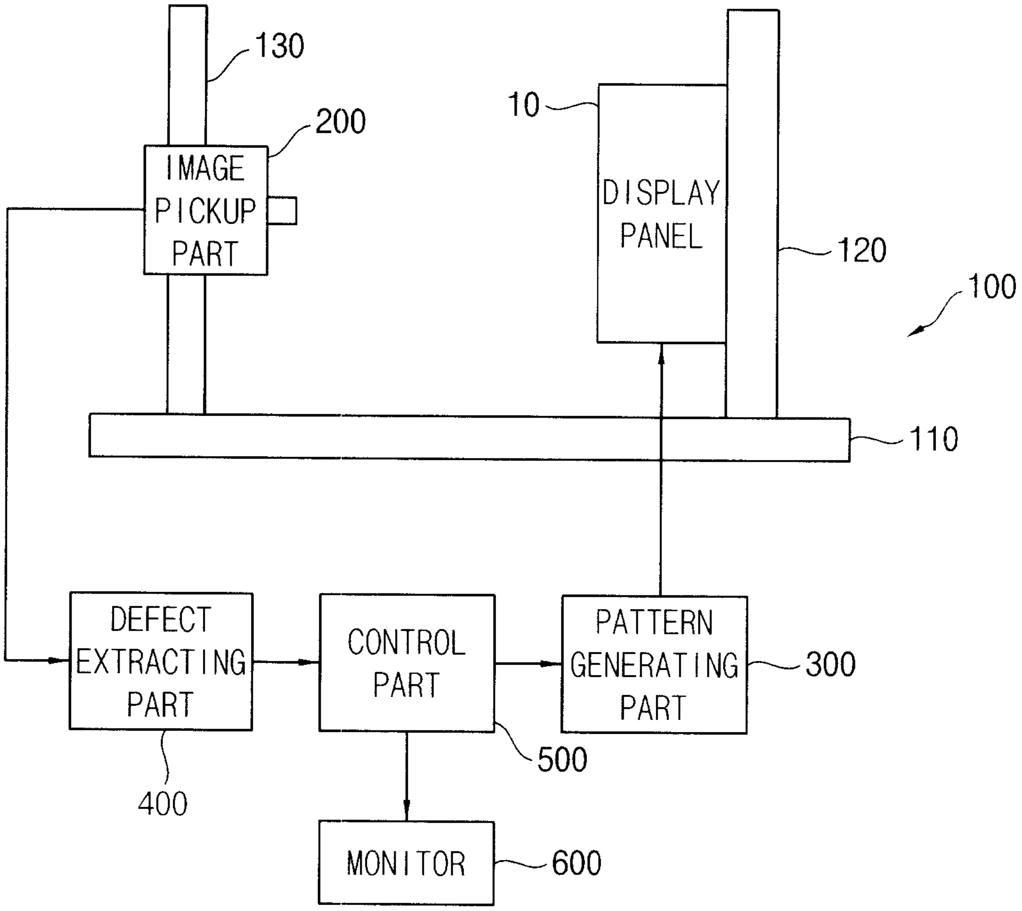
FIG. 1 is a block diagram illustrating an exemplary embodiment of a display panel test apparatus according to the present invention.

The invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity. Like numerals refer to like elements throughout.

It will be understood that when an element or layer is referred to as being "on" another element, it can be directly on the other element or intervening elements may be present. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments will be described in detail with reference to the accompanying drawings.

Figure 2:
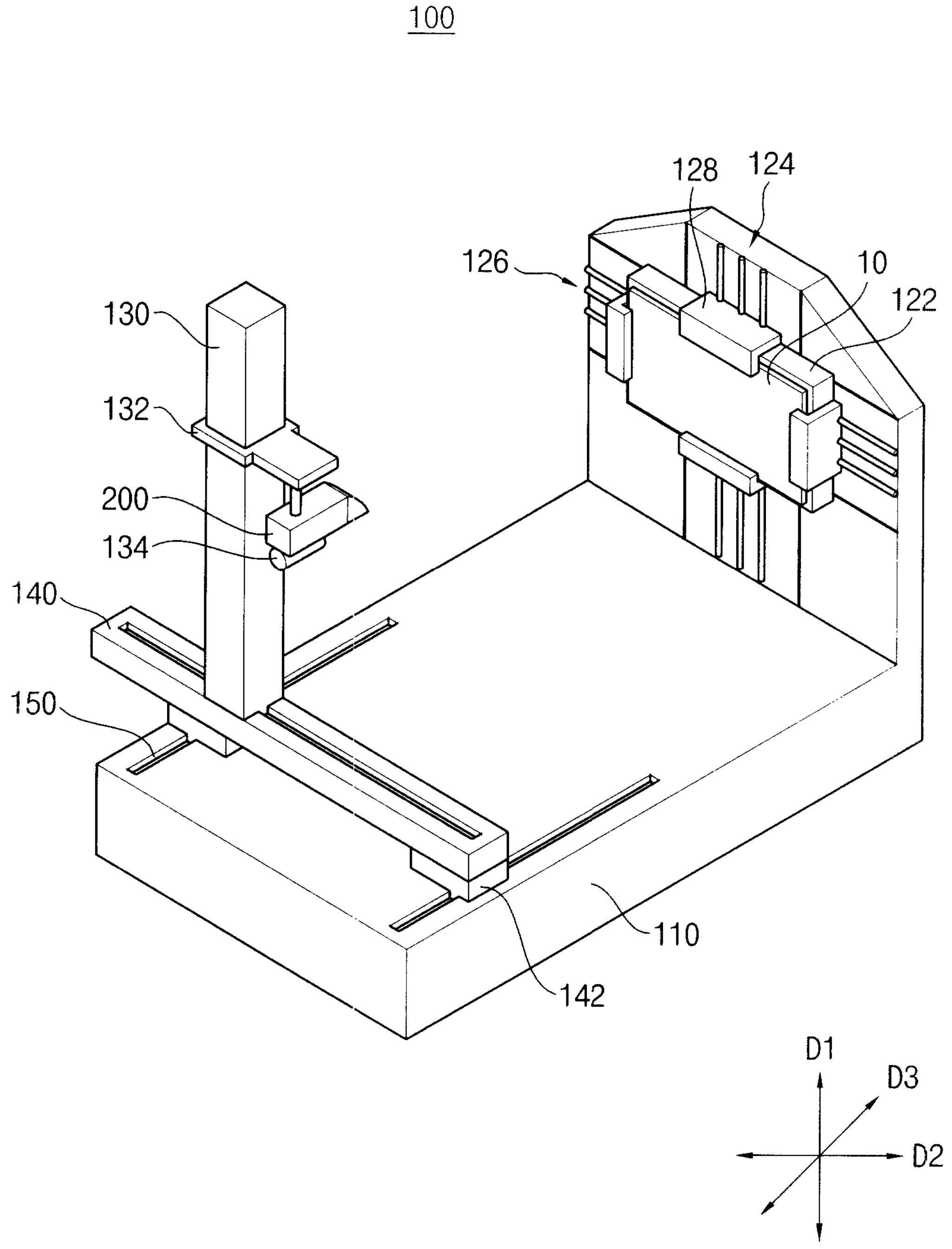
FIG. 2 is a perspective view of an exemplary embodiment of a jig in FIG. 1.

FIG. 1 is a block diagram illustrating an exemplary embodiment of a display panel test apparatus according to the present invention. FIG. 2 is a perspective view of an exemplary embodiment of a jig in FIG. 1.

Referring to FIGS. 1 and 2, an exemplary embodiment of a display panel test apparatus includes a jig 100, an image pickup part 200, a pattern generating part 300, a defect extracting part 400, a control part 500 and a monitor 600.

In an exemplary embodiment, the jig 100 includes a receiving part 122 which receives a target display panel 10, a fixing part 132 which fixes the image pickup part 200, and an adjusting part 134 which adjusts an image pickup angle of the image pickup part 200.

The jig 100 may be configured such that at least one of the receiving part and the fixing part moves upwardly and downwardly to adjust a height of the target display panel with respect to the image pickup part. The jig 100 may be configured such that at least one of the receiving part and the fixing part moves forwardly and backwardly to adjust a distance between the target display panel and the image pickup part.

In an exemplary embodiment, the jig 100 may further include a base body 110, a first supporting frame 120, a second supporting frame 130 and a third supporting frame 140.

In an exemplary embodiment, the first supporting frame 120 may be disposed at a first side of the base body 110. The first supporting frame 120 may include a first guide part 124 and a second guide part 126. The first guide part 124 may extend in a first direction D1 so that a receiving part 122 moves along the first direction D1, and the second guide part 126 may extend in a second direction D2 so that the receiving part 122 moves along the second direction D2. The second direction D2 may cross the first direction D1. The first direction D1 may be substantially perpendicular to the base body 110, and the second direction D2 may be substantially parallel to a plane defined by an upper surface of the base body 110.

The first supporting frame 120 may further include the receiving part 122 which is fixed to the first and second guide parts 124 and 126 and receives a target display panel 10. The receiving part 122 fixes the target display panel 10. In addition, the receiving part 122 may further include a transferring member 128 configured to transfer the target display panel 10 along the first and second guide parts 124 and 126 in the first and second directions D1 and D2, respectively.

The second supporting frame 130 is disposed at a second side of the base body 110 to face the first supporting frame 120. The second supporting frame 130 includes a fixing part 132 that fixes an image pickup part 200 and an adjusting part 134. The image pickup part 200 picks up an image of the target display panel 10, and the adjusting part 134 adjusts an image pickup angle of the image pickup part 200.

In addition, the second supporting frame 130 may further include a guide part (not shown) and a transferring member (not shown) that moves along the guide part, to move the image pickup part 200 vertically along the first direction.

The third supporting frame 140 is disposed on a third guide part 150 which is disposed at both sides of an upper surface of the base body 110. The third supporting frame 140 fixes and supports the second supporting frame 130. The third guide part 150 extends in a third direction D3 to transfer the third supporting frame 140 in the third direction D3, which is substantially perpendicular to the first direction D1. The third supporting frame 140 may further include a transferring member 142 which is disposed between the third supporting frame 140 and the third guide part 150 and transfers the second supporting frame 130 along the third guide part 150 in the third direction D3.

The pattern generating part 300 provides the target display panel 10 fixed to the jig 100 by the receiving part 122 with a preset test pattern image.

The image pickup part 200 is fixed to a portion of the jig 100, e.g., the second supporting frame 130, by the fixing part 132. The image pickup part 200 picks up the test pattern image displayed on the target display panel 10 to obtain test image data. In an exemplary embodiment, the image pickup part 200 may be a charge-coupled device ("CCD") camera. The test image data obtained from the image pickup part 200 is outputted to the defect extracting part 400.

The defect extracting part 400 analyzes the test image data provided from the image pickup part 200 using a defect extracting algorithm to extract display defect information. The defect extracting algorithm includes different settings corresponding to different types of display defects. The defect extracting part 400 outputs the display defect information to the control part 500.

The display defects may include at least one of a color defect, an afterimage defect, a periodic defect having a specific period, and a normal/abnormal defect. The defect extracting algorithm may include an algorithm for extracting the color defect using a difference in chromaticity, an algorithm for extracting the afterimage defect using a difference in contrast sensitivity in boundary areas, an algorithm for extracting the periodic defect by converting the test image data into frequency data having a frequency form, and an algorithm for extracting the normal/abnormal defect by converting the test image data into contrast data.

The color defect may be defined as that a color displayed on a screen is not uniform and chromaticity of the color displayed on the screen is different with respect to a position on the screen due to irregularity of the displayed color. The afterimage defect may be defined as that a specific pattern is viewed in a displayed image with a gray based color after displaying a specific pattern having white and black colors for a substantial amount of time. The periodic defect may be defined as that a specific spot, for example, a line spot, a dropping spot and the like, is repeatedly displayed. The normal/abnormal defect may include a defect other than the defect described above. The normal spot may include a spot having a shape that may be substantially precisely defined, for example, a circular shape, a line shape, an elliptical shape and the like. The abnormal spot may include a spot having a shape that may not be substantially precisely defined.

The control part 500 generates evaluated data corresponding to a viewing angle of the target display panel 10 based on the image pickup angle of the image pickup part 200 and the display defect information provided from the defect extracting part 400. The control part 500 provides the monitor 600 with the evaluated data.

The monitor 600 displays the evaluated data provided from the control part 500. An inspector may check a type of the display defect and a defect level corresponding to the viewing angle of the target display panel 10 based on the evaluated data displayed on the monitor 600.

Figure 3A:
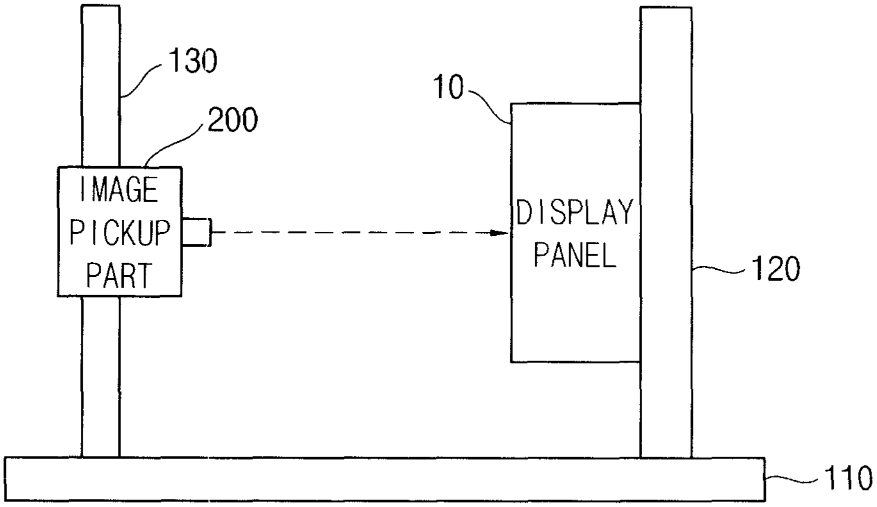
FIGS. 3A to 3C are block diagrams explaining movements of the jig in FIG. 2.
Figure 3B:
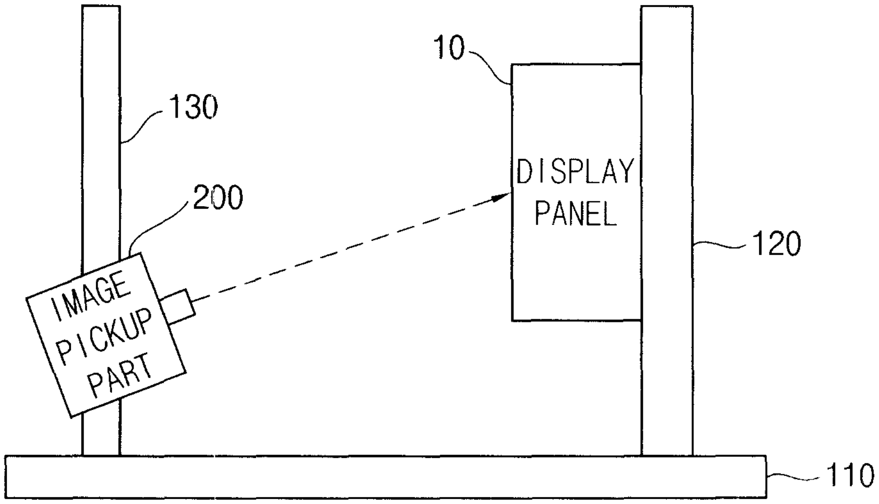
Figure 3C:
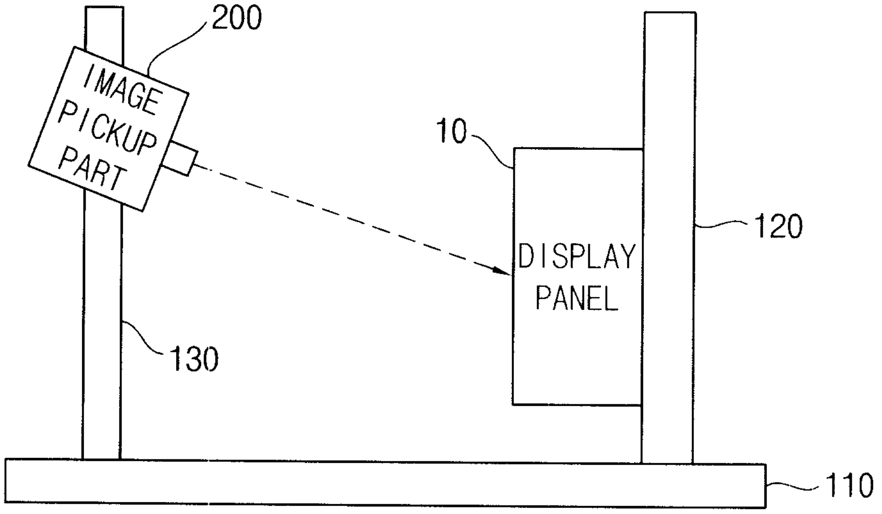

FIGS. 3A to 3C are block diagrams explaining movements of the jig in FIG. 2.

FIGS. 3A to 3C respectively illustrate positions of the image pickup part 200 of the jig for inspecting the display defect in a front side viewing angle, a bottom side viewing angle, and an upper side viewing angle of the target display panel 10.

Referring to FIG. 3A, when the display defect is inspected in the front viewing angle of the target display panel 10, the image pickup part 200 is disposed substantially in parallel with the front side of the target display panel 10.

Referring to FIG. 3B, when the display defect is inspected in the bottom viewing angle of the target display panel 10, the image pickup part 200 is disposed at a position lower than the position of the image pickup part 200 for inspecting the display defect in the front viewing angle. Thus, the target display panel 10 is disposed at a position higher than the position of the target display panel 10 for inspecting the display defect in the front viewing angle. In addition, the image pickup part 200 is inclined with respect to a direction substantially perpendicular to the second supporting frame 130 by a predetermined angle.

Here, the inclined angle of the image pickup part 200 may change according to a distance between the image pickup part 200 and the target display panel 10. In an exemplary embodiment, when the distance between the image pickup part 200 and the target display panel 10 is about 2,750 mm, the image pickup part 200 may be inclined to an upper direction with respect to the direction substantially perpendicular to the second supporting frame 130 by about 34 degrees. In an alternative exemplary embodiment, when the distance is about 2,400 mm, the inclined angle may be about 40 degrees.

Referring to FIG. 3C, when the display defect is inspected in the upper viewing angle of the target display panel 10, the image pickup part 200 is disposed at a position higher than a position of the image pickup part 200 for inspecting the display defect in the front viewing angle. Thus, the target display panel 10 is disposed at a position lower than the position of the target display panel 10 for inspecting the display defect in the front viewing angle. In addition, the image pickup part 200 is inclined with respect to a direction substantially perpendicular to the second supporting frame 130 by a predetermined angle. The inclined angle of the image pickup part 200 may be substantially the same as the inclined angle of the image pickup part 200 for inspecting the display defect in the bottom viewing angle except for the direction of the inclined angle.

Figure 4:
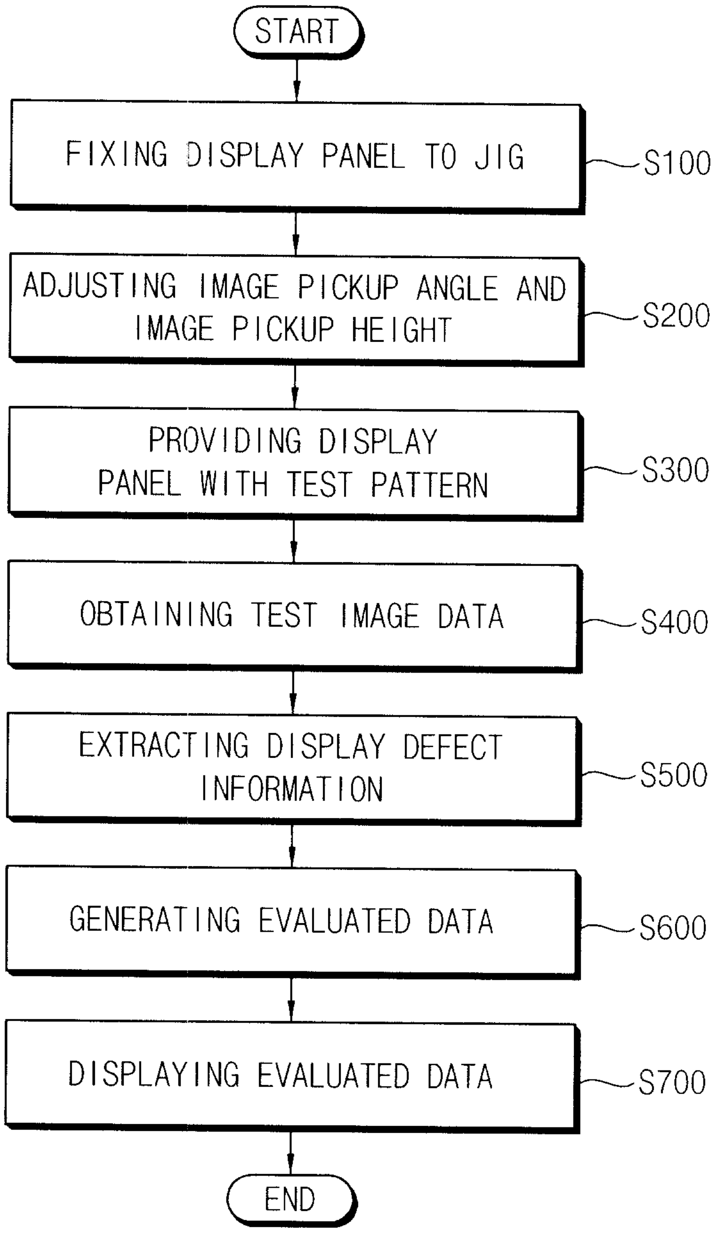
FIG. 4 is a flow chart explaining an exemplary embodiment of a method of testing a display panel using the display panel test apparatus in FIG. 1.

FIG. 4 is a flow chart explaining an exemplary embodiment of a method of testing a display panel using the display panel test apparatus in FIG. 1.

Referring now to FIGS. 1 and 4, the target display panel 10 is fixed to the jig 100 (step S100).

An image pickup angle of the image pickup part 200, a height of the image pickup part 200, and a height of the receiving part 122 are adjusted to a position corresponding to a viewing angle of the target display panel 10 (step S200).

The test pattern generating part 300 provides the target display panel 10 with a preset test pattern image (step S300).

The image pickup part 200 picks up the test pattern image displayed on the target display panel 10 to obtain the test image data (step S400). The image pickup part 200 provides the defect extracting part 400 with the test image data.

The defect extracting part 400 analyzes the test image data using a defect extracting algorithm to extract image defect information (step S500). The defect extracting part 400 provides the control part 500 with the display defect information.

The control part 500 generates evaluated data corresponding to the viewing angle of the target display panel based on the image pickup angle of the image pickup part and the display defect information provided from the defect extracting part 400 (step S600). The control part 500 outputs the evaluated data to the monitor 600.

The monitor 600 displays the evaluated data provided from the control part 500 (step S700). The inspector may check a type of the display defect and a defect level corresponding to the viewing angle of the target display panel 10 based on the evaluated data displayed on the monitor 600.

Figure 5:
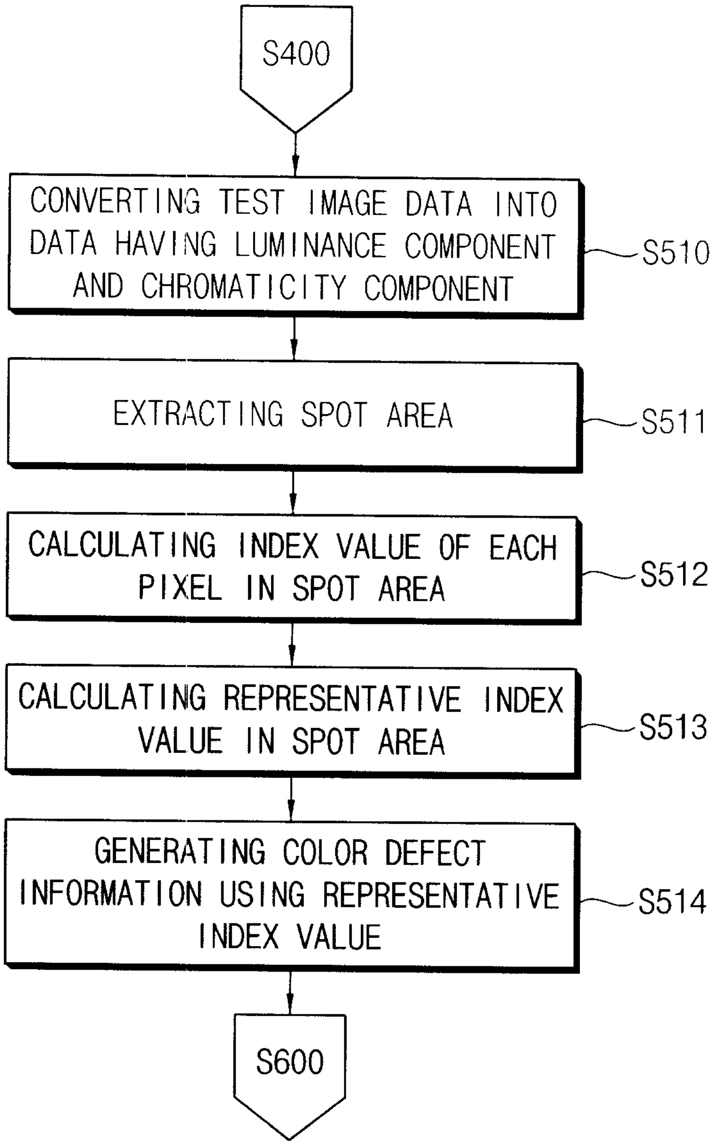
FIG. 5 is a flow chart explaining an exemplary embodiment of a process extracting color defect information of display defect information in FIG. 4.

FIG. 5 is a flow chart explaining an exemplary embodiment of a process of extracting color defect information of display defect information in FIG. 4.

Referring to FIG. 5, the defect extracting part 400 converts the test image data provided from the image pickup part 200 into data having a luminance component and a chromaticity component (step S510). In an exemplary embodiment, the defect extracting part 400 converts the test image data having a RGB format into data having a YUV format. Here, Y is the luminance component, and U and V are the chromaticity components.

The defect extracting part 400 compares the chromaticity of the converted data with a reference chromaticity to extract a spot area where the chromaticity of the converted data differs from the reference chromaticity (step S511).

The defect extracting part 400 extracts an index value corresponding to each pixel of the spot area (step S512). In an exemplary embodiment, the index value corresponding to each pixel may be calculated by Equation 1 as follows.

$$\text{Index}=\sqrt{(u'-u'_{ref})^2+(v'-v'_{ref})^2} \qquad \text{<Equation 1>}$$

Here, "u" and "v" indicate chromaticity according to the International Commission on Illumination ("C.I.E."), for example, the chromaticity according to C.I.E., 1976. In addition, "$u_{ref}$" and "$v_{ref}$" indicate chromaticity of data at a center of the spot area.

The defect extracting part 400 extracts a representative index value of the spot area using the index values corresponding to each pixel of the spot area (step S513). The defect extracting part 400 extracts the maximum index value among the index values corresponding to the each pixel as the representative index value of the spot area.

The defect extracting part 400 generates color defect information using the representative index value corresponding to each spot area, and outputs the color defect information to the control part 500 (step S514). The color defect information is used for evaluating an occurrence of the color defect and an occurrence level of the color defect.

The control part 500 compares the representative index value with a predetermined threshold value to generate evaluated data, and whether the color defect occurs or not may be evaluated based on the evaluated data. When the representative index value is greater than the threshold value, the color defect may occur. In addition, the representative index value may be substantially proportional to the occurrence level of the color defect. In an exemplary embodiment, the greater the representative index value is, the higher the occurrence level of the color defect is, and the less the representative index value is, the lower the occurrence level of the color defect is.

Figure 6:
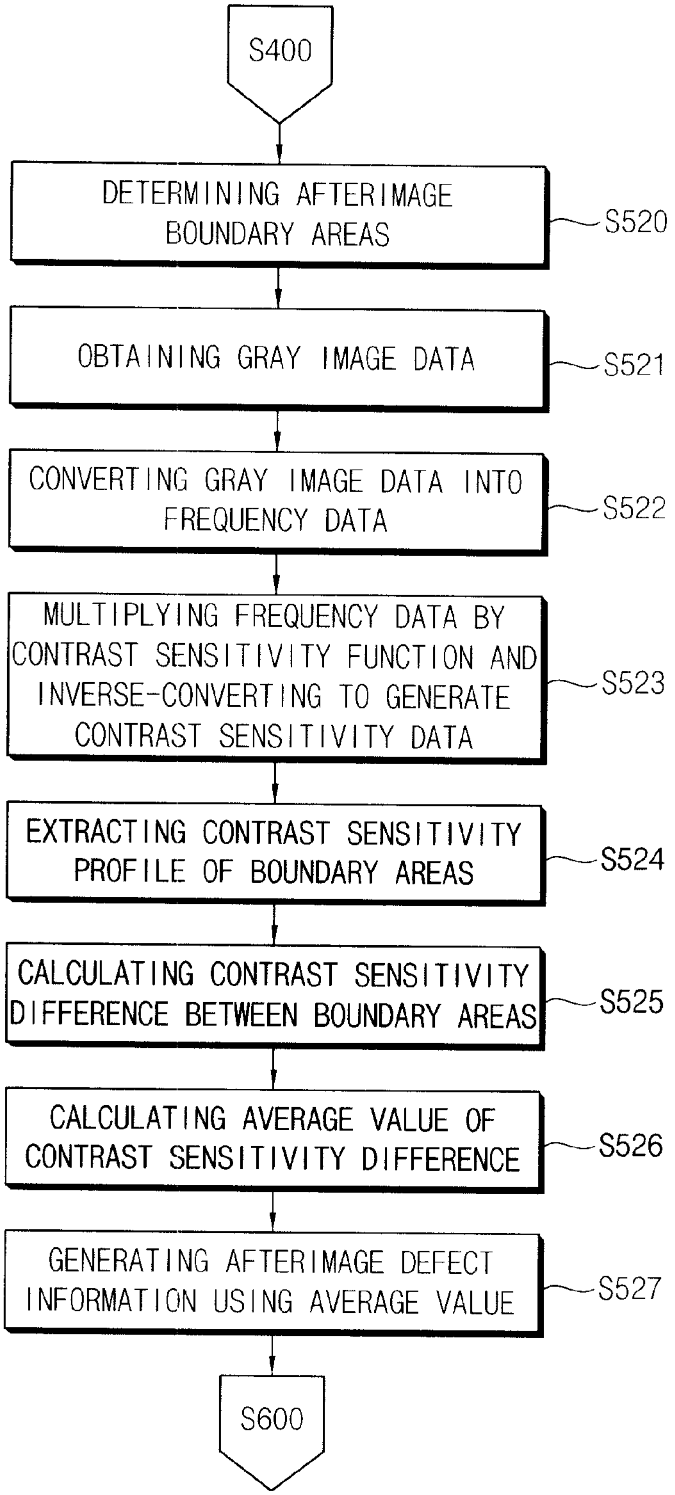
FIG. 6 is a flow chart explaining an exemplary embodiment of a process of extracting afterimage defect information of the display defect information in FIG. 4.

FIG. 6 is a flow chart explaining an exemplary embodiment of a process of extracting afterimage defect information of display defect information in FIG. 4.

The afterimage defect may occur when a specific cross-stripe pattern is displayed for a substantial amount of time. In an exemplary embodiment, the test pattern image provided to the target display panel 10 in the step S300 of FIG. 4 may be a cross-stripe pattern image. Therefore, the test image data in a step S400 corresponds to the cross-stripe pattern image.

Referring to FIGS. 1 and 6, the defect extracting part 400 determines afterimage boundary areas based on the test image data corresponding to the cross-stripe pattern image obtained from the image pickup part 200 (step S520). In an exemplary embodiment, when the cross-stripe pattern includes black and white colors, the afterimage boundary area is a boundary area between the white image and the black image.

After the cross-stripe pattern image is displayed for a predetermined period, a gray test pattern image is provided to the target display panel 10 to determine occurrence of the afterimage defect.

The image pickup part 200 picks up the gray test pattern image displayed on the target display panel 10 to obtain gray image data (step S521). The image pickup part 200 provides the defect extracting part 400 with the gray image data.

The defect extracting part 400 converts the gray image data into frequency data having a frequency form (step S522).

The defect extracting part 400 multiplies the frequency data by a contrast sensitivity function ("CSF") corresponding to human visual characteristics, and inversely converts the frequency data to generate contrast sensitivity data (step S523).

The defect extracting part 400 extracts contrast sensitivity profiles of each of the afterimage boundary areas (step S524).

The defect extracting part 400 calculates a difference value ΔCS of the contrast sensitivity in each of the afterimage boundary areas using the contrast sensitivity profiles (step S525). The difference value ΔCS of the contrast sensitivity may be calculated by Equation 2 as follows.

$$\Delta CS=CS_{peak1}-CS_{peak2} \qquad \text{<Equation 2>}$$

Here, "$CS_{peak1}$" indicates the maximum value extracted from the contrast sensitivity profiles, and "$CS_{peak2}$" indicates the minimum value extracted from the contrast sensitivity profiles.

The defect extracting part 400 calculates an average value of the difference value ΔCS of the contrast sensitivity in each of the afterimage boundary areas (step S526).

The defect extracting part 400 generates afterimage defect information using the average value, and outputs the afterimage defect information to the control part 500 (step S527). The afterimage defect information is used for evaluating an occurrence of the afterimage defect and an occurrence level of the afterimage defect.

The control part 500 compares the average value with a predetermined threshold value to generate evaluated data, and whether the afterimage defect occurs or not may be evaluated based on the evaluated data. When the average value is greater than the threshold value, the afterimage defect may occur. In addition, the average value may be substantially proportional to the occurrence level of the afterimage defect. In an exemplary embodiment, the greater the average value is, the higher the occurrence level of the afterimage defect is, and the less the average value is, the lower the occurrence level of the afterimage defect is.

Figure 7:
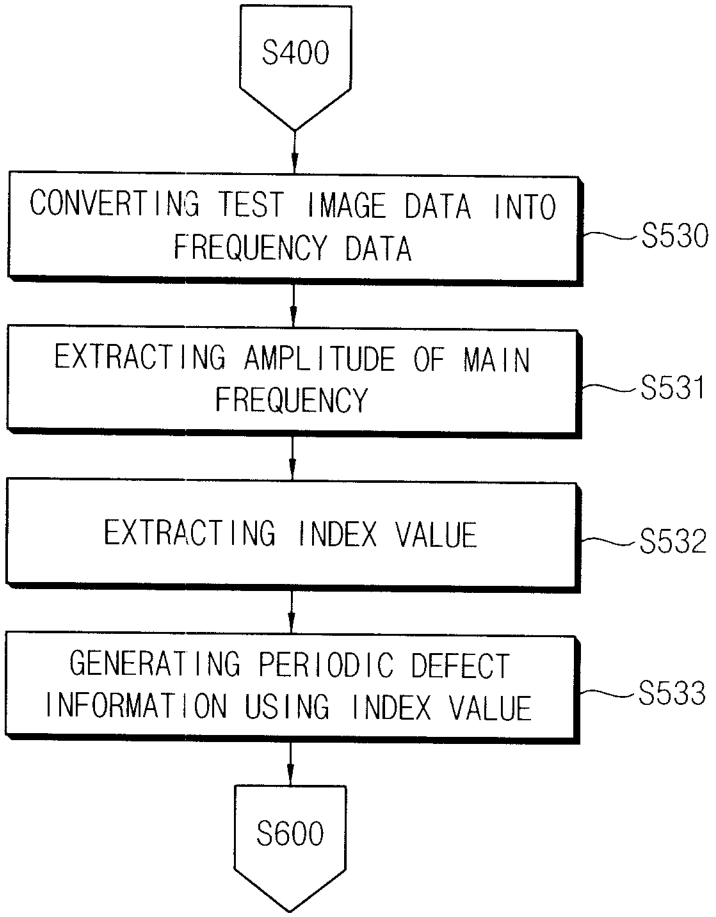
FIG. 7 is a flow chart explaining an exemplary embodiment of a process of extracting periodic defect information of the display defect information in FIG. 4.

FIG. 7 is a flow chart explaining an exemplary embodiment of a process of extracting periodic defect information of display defect information in FIG. 4.

Referring to FIGS. 1 and 7, the defect extracting part 400 converts the test image data provided from the image pickup part 200 into frequency data having a frequency form (step S530).

The defect extracting part 400 analyzes the frequency data to extract the amplitude of a main frequency corresponding to a spot (step S531). In an exemplary embodiment, a frequency signal repeated in a specific period corresponding to existence of periodic spots, and an interval of the frequency signal is the main frequency.

The defect extracting part 400 calculates an index value using the amplitude of the main frequency and amplitudes of frequencies close to the main frequency (step S532). The index value may be calculated by Equation 3 as follows.

$$\text{Index} = \left[\frac{S_a - R_a}{R_a}\right] \quad \text{(Equation 3)}$$

Here, "$S_a$." indicates the amplitude of the main frequency, and "$R_a$" indicates an average of the amplitude of the frequencies around the main frequency.

The defect extracting part 400 generates periodic defect information using the index value, and outputs the periodic defect information to the control part 500 (step S533). The periodic defect information is used for evaluating an occurrence of the periodic defect and an occurrence level of the periodic defect.

The control part 500 compares the index value with a predetermined threshold value to generate evaluated data, and whether the periodic defect occurs or not may be evaluated based on the evaluated data. In an exemplary embodiment, when the index value is greater than the threshold value, the periodic defect may occur. In addition, the index value may be substantially proportional to the occurrence level of the periodic defect. In an exemplary embodiment, the greater the index value is, the higher the occurrence level of the periodic defect is, and the less the index value is, the lower the occurrence level of the periodic defect is.

Figure 8:
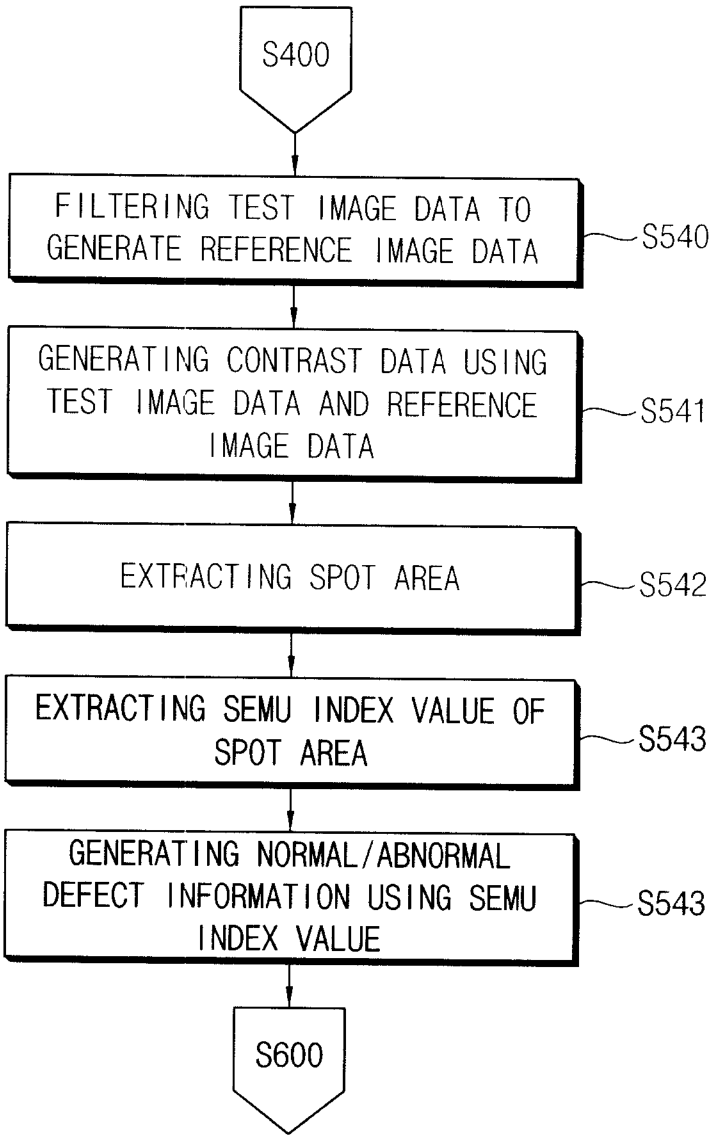
FIG. 8 is a flow chart explaining an exemplary embodiment of a process of extracting normal/abnormal defect information of the display defect information in FIG. 4.

FIG. 8 is a flow chart explaining en exemplary embodiment of a process of extracting a normal/abnormal defect information of the display defect information in FIG. 4.

Referring to FIGS. 1 and 8, the defect extracting part 400 filters test image data provided from the image pickup part 200 using a filter, e.g., a gaussian filter, to generate reference image data (step S540).

The defect extracting part 400 generates contrast data using the test image data and the reference image data (step S541). The contrast data C may be calculated by Equation 4 as follows.

$$C = \frac{L - L_{ref}}{L_{ref}} \quad \text{(Equation 4)}$$

Here, "L" indicates a luminance of the test image data, and "$L_{ref}$" indicates a luminance of the reference image data.

The defect extracting part 400 extracts a spot area using the contrast data (step S542). In an exemplary embodiment, the defect extracting part 400 may extract an area where the contrast data having a value greater than a predetermined value exist as the spot area.

The defect extracting part 400 calculates SEMI Mura ("SEMU") index value in the spot area (step S543). The SEMU index value in the spot area may be calculated by Equation 5 as follows.

$$SEMU\ \text{Index} = \frac{C_{avg}}{\left(\frac{b}{S^k} + a\right)} \quad \text{(Equation 5)}$$

Here, "$C_{avg}$" indicates an average contrast value in the spot area, and "S" indicates an area of the spot area. In addition, "a," "b" and "k" indicate constants having values of 0.72, 1.97 and 0.33, respectively.

The defect extracting part 400 generates normal/abnormal defect information using the SEMU index value, and outputs the normal/abnormal defect information to the control part 500 (step S544). The normal/abnormal defect information is used for evaluating an occurrence of the normal/abnormal defect and an occurrence level of the normal/abnormal defect.

The control part 500 compares the SEMU index value with a predetermined threshold value to generate evaluated data, and whether the normal/abnormal defect occurs may be evaluated based on the evaluated data. When the SEMU index value is greater than the threshold value, the normal/abnormal defect may occur. In addition, the SEMU index value may be substantially proportional to the occurrence level of the normal/abnormal defect. In an exemplary embodiment, the greater the SEMU index value is, the higher the occurrence level of the normal/abnormal defect is, and the less the SEMU index value is, the lower the occurrence level of the normal/abnormal defect is.

In exemplary embodiments according to the present invention as described herein, the display panel test apparatus automatically tests the display panel, so that the difference between various detection abilities according to different individual inspectors is substantially decreased, and the reliability of the inspection is thereby substantially increased.

In exemplary embodiments, the target display panel is fixed and the image pickup angle of the image pickup part is adjusted, and testing conditions are thereby substantially similar to testing conditions under the eye inspection. In addition, the defect information is extracted using the algorithm including different settings corresponding to different types of display defects, and the accuracy of testing is thereby substantially improved.

The foregoing is illustrative of the present disclosure and is not to be construed as limiting thereof. Although a limited number of exemplary embodiments have been described, those skilled in the art will readily appreciate that many modifications to the exemplary embodiments are possible without materially departing from the novel teachings and advantages disclosed herein. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific example embodiments disclosed, and that modifications to the disclosed example embodiments, as well as other example embodiments, are intended to be included within the scope of the appended claims. Embodiments of the present invention are defined by the following claims, with equivalents of the claims to be included therein.

What is claimed is:

1. A method of testing a display panel, the method comprising:

fixing a target display panel to a receiving part of a jig;

adjusting an image pickup angle of a single image pickup part using an adjusting part fixed to the jig;

providing the target display panel with a test pattern to be displayed on the target display panel;

obtaining test image data of the test pattern by picking up the test pattern using the image pickup part;

extracting image defect information by analyzing the test image data using a defect extracting algorithm; and generating an evaluated data corresponding to a viewing angle of the target display panel based on the image pickup angle of the image pickup part and the display defect information, where the extracting the image defect information by analyzing the test image data comprises:

converting the test image data into data having a luminance component and a chromaticity component;

extracting a spot area by comparing a chromaticity of the converted data with a reference chromaticity using index values in pixels of the spot area;

calculating a representative index value of the spot among the index values; and generating color defect information using the representative index value, wherein each of the index values "I" is defined by:

$$I=\sqrt{(u-u_{\mathrm{ref}})^2+(v-v_{\mathrm{ref}})^2},$$

wherein "u" and "v" are chromaticities according to C.I.E. 1976, and "$u_{ref}$" and "$v_{ref}$" are chromaticities at a center pixel of the spot area.

2. A method of testing a display panal, the method comprising:

fixing a target panel to a receiving part of a jig;

adjusting an image pickup angle of single image pickup part using an adjusting part fixed to the jig;

providing the target display panel with a test pattern to be displayed on the target display panel;

obtaining test image data of the pattern by picking up the pattern using the image pickup part;

extracting image defect information by analyzing the test image data using a defect extracting algorithm; and generating an evaluated data corresponding to a viewing angle of the target display panel based on the image pickup angle of the image pickup part and the display defect information, wherein the extracting the image defect information by analyzing the test image data comprises:

converting gray image data provide from the image pickup part into frequency data having a frequency from after determining afterimage boundary areas using the test image data;

generating contrast sensitivity data by multiplying the frequency data by a contrast sensitivity function and inverse-converting the frequency data;

calculating an average value of the sensitivity difference values by calculating each of contrast sensitivity difference values between the afterimage boundary areas; and generating an afterimage defect information using the average value of the contrast sensitivity difference values, wherein each of the contrast sensitivity difference values "ΔCS" is defined by:

$$\Delta CS=CS_{peak\,1}-CS_{peak\,2},$$

wherein "$CS_{peak1}$" is a maximum value extracted from a contrast sensitivity profile, and "$CS_{peak2}$" is a minimum value extracted form a contrast sensitivity profile, wherein the test image data is obtained by picking up a cross-stripe pattern image.

3. A method of testing a display panel, the method comprising:

fixing a target display panel to a receiving part of a jig;

adjusting an image pickup angle of an image pickup part using an adjusting part fixed to the jig;

providing the target display panel with a test pattern to be displayed on the target display panel;

obtaining test image data of the test pattern by picking up the test pattern using the image pickup part;

extracting image defect information by analyzing the test image data using a defect extracting algorithm; and generating an evaluated data corresponding to a viewing angle of the target display panel based on the image pickup angle of the image pickup part and the display defect information, wherein the extracting the image defect information by analyzing the test image data comprises:

converting the test image data into frequency data having a frequency form;

extracting a main frequency corresponding to a spot using the frequency data, and calculating an index value corresponding to the spot using an amplitude of the main frequency and amplitudes of frequencies substantially close to the main frequency; and generating periodic defect information using the index value, wherein the index value "I" is defined by:

$$I=\frac{S_a-R_a}{R_a},$$

wherein "Sa" is the amplitude of the main frequency, and "Ra" is an average of the amplitudes of frequencies substantially close to the main frequency.

4. A method of testing a display panel, the method comprising:

fixing a target display panel to a receiving part of a jig;

adjusting an image pickup angle of an image pickup part using an adjusting part fixed to the jig;

providing the target display panel with a test pattern to be displayed on the target display panel;

obtaining test image data of the test pattern by picking up the test pattern using the image pickup part;

extracting image defect information by analyzing the test image data using a defect extracting algorithm; and generating an evaluated data corresponding to a viewing angle of the target display panel based on the image pickup angle of the image pickup part and the display defect information, wherein the extracting the image defect information by analyzing the test image data comprises:

filtering the test image data to generate reference image data;

generating contrast data using the test image data and the reference image data;

extracting a spot area using the contrast data, and calculating a SEMU index value of the spot area; and generating at least one of normal defect information and abnormal defect information using the SEMU index value, wherein the contrast data "C" is defined by:

$$C = \frac{L - L_{ref}}{L_{ref}},$$

wherein "L" is a luminance of the test image data, and "Lref" is a luminance of the reference image data, and wherein the SEMU index value "SEMU I" is defined by:

$$SEMU\ I = \frac{C_{avg}}{\frac{b}{S^k} + a},$$

wherein "Cavg" is an average contrast value in the spot area, and "S" is an area of the spot area, and "a", "b" and "k" are values of 0.72, 1.97 and 0.33 respectively.

5. A display panel test apparatus comprising:

a single image pickup part which picks up an image generated on a target display panel;

a jig comprising:

a receiving part which receives the target display panel;

a fixing part which fixes the image pickup part; and an adjusting part which adjusts an image pickup angle of the image pickup part;

a pattern generating part which provides the target display panel with a test pattern generated on the target display panel;

a defect extracting part which analyzes test image data of the test pattern provided from the image pickup part using a defect extracting algorithm and extracts display defect information; and a control part which generates evaluated data corresponding to a viewing angle of the target display panel using the image pickup angle of the image pickup part and the display defect information, wherein the defect extracting algorithm comprises:

converting the test image data into data having a luminance component and a chromaticity component;

extracting a spot area by comparing a chromaticity of the converted data with a reference chromaticity using index values in pixels of the spot area;

calculating a representative index value of the spot area among the index values; and generating color defect information using the representative index value, wherein each of the index values "I" is defined by:

$$I = \sqrt{(u-u_{ref})^2 + (v-v_{ref})^2}$$

wherein "u" and "v" are chromaticities according to C.I.E. 1976, and "$u_{ref}$" and "$v_{ref}$" are chromaticities at a center pixel of the spot area.

6. A display panel test apparatus comprising:

a single image pickup part which picks up an image generated on a target display panel;

a jig comprising:

a receiving part which receives the target display panel;

a fixing part which fixes the image pickup part; and an adjusting part which adjusts an image pickup angle of the image pickup part;

a pattern generating part which provides the target display panel with a test pattern generated on the target display panel;

a defect extracting part which analyzes test image data of the test pattern provided from the image pickup part using a defect extracting algorithm and extracts display defect information; and a control part which generates evaluated data corresponding to a viewing angle of the target display panel using the image pickup angle of the image pickup part and the display defect information, wherein the defect extracting algorithm comprises:

converting gray image data provided from the image pickup part into frequency data having a frequency form after determining afterimage boundary areas using the test image data;

generating contrast sensitivity data by multiplying the frequency data by a contrast sensitivity function and inverse-converting the frequency data;

calculating an average value of the contrast sensitivity difference values by calculating each of contrast sensitivity difference values between the afterimage boundary areas; and generating an afterimage defect information using the average value of the contrast sensitivity difference values, wherein each of the contrast sensitivity difference values "ΔCS" is defined by:

$$\Delta CS = CS_{peak\,1} - CS_{peak\,2},$$

wherein "$CS_{peak1}$" is a maximum value extracted from a contrast sensitivity profile, and "$CS_{peak2}$" is a minimum value extracted from the contrast sensitivity profile, wherein the test image data is obtained by picking up a cross-stripe pattern image.

7. A display panel test apparatus comprising:

a single image pickup part which picks up an image generated on a target display panel;

a jig comprising:

a receiving part which receives the target display panel;

a fixing part which fixes the image pickup part; and an adjusting part which adjusts an image pickup angle of the image pickup part;

a pattern generating part which provides the target display panel with a test pattern generated on the target display panel;

a defect extracting part which analyzes test image data of the test pattern provided from the image pickup part using a defect extracting algorithm and extracts display defect information; and a control part which generates evaluated data corresponding to a viewing angle of the target display panel using the image pickup angle of the image pickup part and the display defect information, wherein the defect extracting algorithm comprises:

converting the test image data into frequency data having a frequency form;

extracting a main frequency corresponding to a spot using the frequency data, and calculating an index value corresponding to the spot using an amplitude of the main frequency and amplitudes of frequencies substantially close to the main frequency; and generating periodic defect information using the index value, wherein the index value "I" is defined by:

$$I = \frac{S_a - R_a}{R_a},$$

wherein "Sa" is the amplitude of the main frequency, and "Ra" is an average of the amplitudes of frequencies substantially close to the main frequency.

8. A display panel test apparatus comprising:

a single image pickup part which picks up an image generated on a target display panel;

a jig comprising:

a receiving part which receives the target display panel;

a fixing part which fixes the image pickup part; and an adjusting part which adjusts an image pickup angle of the image pickup part;

a pattern generating part which provides the target display panel with a test pattern generated on the target display panel;

a defect extracting part which analyzes test image data of the test pattern provided from the image pickup part using a defect extracting algorithm and extracts display defect information; and a control part which generates evaluated data corresponding to a viewing angle of the target display panel using the image pickup angle of the image pickup part and the display defect information, wherein the defect extracting algorithm comprises:

filtering the test image data to generate reference image data;

generating contrast data using the test image data and the reference image data;

extracting a spot area using the contrast data, and calculating a SEMU index value of the spot area; and generating at least one of normal defect information and abnormal defect information using the SEMU index value, wherein the contrast data "C" is defined by:

$$C = \frac{L - L_{ref}}{L_{ref}},$$

wherein "L" is a luminance of the test image data, and "Lref" is a luminance of the reference image data, and wherein the SEMU index value "SEMU I" is defined by:

$$SEMU\ I = \frac{C_{avg}}{\frac{b}{S^k} + a},$$

wherein "Cavg" is an average contrast value in the spot area, and "S" is an area of the spot area, and "a", "b" and "k" are values of 0.72, 1.97 and 0.33 respectively.

* * * * *